T. J. HALL.
Coffee Roaster

No. 97,083.                    Patented Nov. 23, 1869.

Witnesses:
John F. Fennell,
Chas. C. Wilson

Inventor:
Thomas J. Hall
By his Attorney
Newton Cranford

United States Patent Office.

THOMAS J. HALL, OF BRYAN, TEXAS.

Letters Patent No. 97,083, dated November 23, 1869.

COFFEE-ROASTER.

The Schedule referred to in these Letters Patent and making part of the same

*To whom it may concern:*

Be it known that I, THOMAS J. HALL, of Bryan, in the county of Brazos, in the State of Texas, have invented certain Improvements in the Stirrers or Means for Stirring the Coffee-Grains while being Roasted.

The object of this invention is to supply a ready and cheap means of effectually stirring the grains of coffee while being roasted in any convenient and suitable vessel; and It consists of a removable cover, that will fit on to the top of any open culinary vessel, such as a round spider, pan, or skillet, that contains the coffee; and, by vibrating the cover, the stirrers, which depend from the under side of the removable cover, will act to stir the coffee in the pan while being roasted.

In the drawings—

Figure 1:
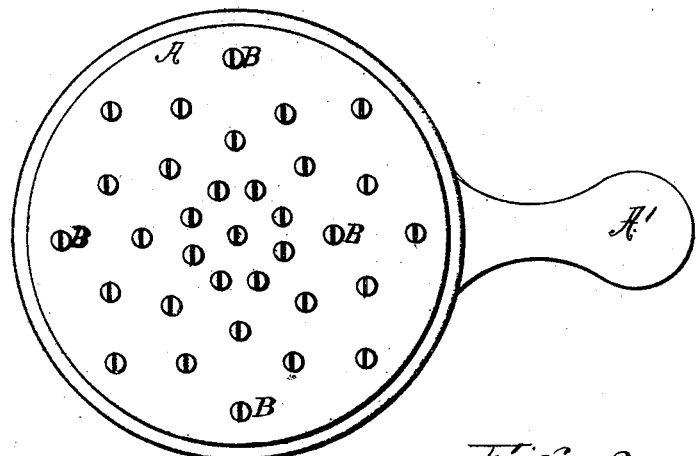
Figure 1 represents a view of the under side of the cover.
Figure 2:
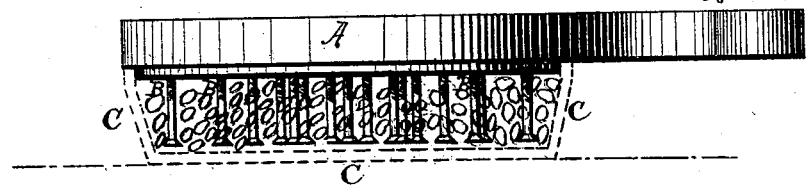
Figure 2 is an upright view of same, and vessel in dotted line.
Figure 3:
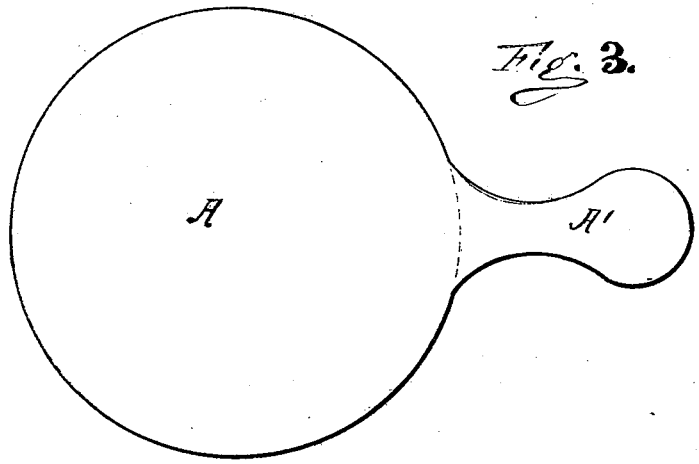
Figure 3 is a top view of same.

General Description.

A is the removable cover, having a series of stirrers, B, depending from its under side, which extends to near the bottom of the pan C, which contains the coffee.

This cover may be of wood or metal, as desired; but, if made of wood, common wood-screws may be used for the stirrers B, by simply turning them into the cover A, in such form as will produce the effect of stirring the coffee; or the stirrers may be cut or wrought nails, driven into the cover in the form that the screws would have.

This cover has a handle, A', which may be a part of the cover itself, if made of wood; or a handle may be attached to the cover, made of a separate piece of wood from the cover; or it may be a metal handle; and its use is to vibrate the cover, by the operator taking hold of the handle, which may be longer or shorter, as desired, and simply vibrating it horizontally on the top of the spider or other vessel containing the coffee.

The rebate in the cover keeps it in its place.

The stirrers B may be attached to cover A in any desired form that will best accomplish the complete stirring of the coffee, whether in concentric circles, or other forms that will have the same effect on the coffee, and, in their construction, may be round, square, or other form, but I prefer a round or cylindrical body, and an enlarged part at the extremity, similar to the screw-head, which comes near to the bottom of the pan, so that it will not only push the coffee, to change its position, but lift it from the bottom as well, by the thin flange-shape which projects from the head or end of the stirrer.

The cover is no part of the vessel which contains the coffee, but is simply a device which may be placed upon such vessel, and is only used as a means of stirring the coffee in the pan or spider, which is used for other purposes in cooking.

The stirrers may also be attached to bars of metal attached to the under side of the cover, without departing from my invention, and there may be deflecting-plates placed near the centre of the under side of the cover, that will, as the cover is vibrated, either tend to move the grain of coffee toward or from the centre of the vessel as the cover is vibrated; but, whatever method is used of attaching the stirrers to the cover, or whatever may be the shape of the stirrers, they must be attached to and vibrate with the cover, which is removable.

It is a well-known fact that most of the coffee that is roasted in sparsely-settled districts in the United States is done in an open vessel placed over a fire of coals or wood in a stove, or, where stoves are not used, in an open fire-place; and, when the vessel, with the coffee therein, is heated to the proper heat, the tender or cook stirs the coffee with a fork, spoon, forked stick, or other means at hand, and, at best, only imperfectly roasts the coffee, as some grains will be burned, others cooked too much, or not enough, and the consequence is that the beverage made from such roasted coffee is never good or palatable.

This invention is designed to be used in the place of and to supersede the primitive and imperfect manner of roasting coffee just above described. The device is simple, cheap, such as a child can successfully operate, that will give the utmost satisfaction in the result, both in the quality of the roasted coffee, and comfort enjoyed in the operation of roasting, by not being obliged to be directly over a hot fire, with a fork, to stir the coffee; but the operator can be at a distance from the vessel, and vibrate the cover, and effectually roast the coffee evenly, and just enough, when the vessel is removed from the fire, and the coffee is poured out of the vessel; or it may still be retained therein, and continue the vibration of the cover until cool, as, by so doing, the aroma of the coffee is not allowed to escape from the vessel, which is a great improvement over an open vessel in which coffee is roasted.

I am aware that removable covers have been used on vessels containing coffee, and having attached thereto the means of stirring the coffee; but such devices were expensive in their construction, as the cover had to be permanently fastened to the vessel, so that it would not revolve; and a shaft which went through the cover, and revolved therein, and having stirrers attached to such shaft, could operate to stir the coffee; and I lay no claim to any such construction, confining myself to the removable cover and its appendages, that are all attached together; and, when placed upon the top of a vessel, and vibrated, all the parts vibrate together; and, when the coffee is properly cooked or roasted, the device, as a whole, is taken off, and put in its proper place, and ready for use when wanted.

Having thus described my invention,

What I claim, and desire to secure by Letters Patent, is—

The removable coffee-stirrer, when constructed with the stirrers B, attached to and depending from the under side of cover A, and operating in the manner and for the purpose substantially as described.

THOS. J. HALL.

Witnesses:
JOHN F. FENNELL,
H. P. STOCKTON.